Figure 9:
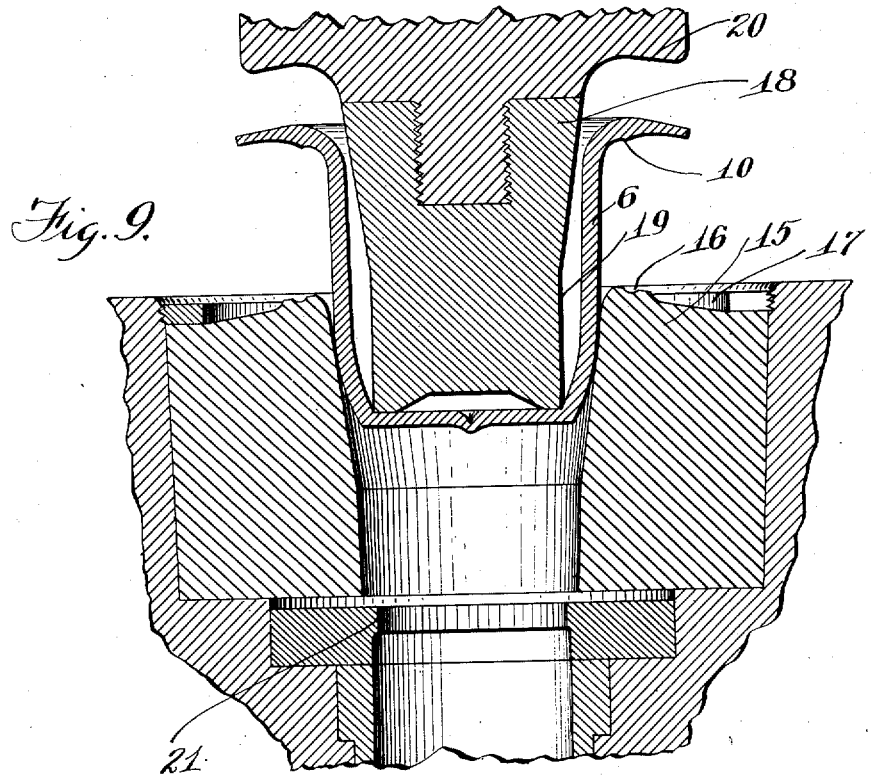

I. A. GEORGE.
METHOD OF MAKING RACEWAY WALLS FOR BEARINGS.
APPLICATION FILED JAN. 8, 1913.
1,173,793.
Patented Feb. 29, 1916.
8 SHEETS—SHEET 1.
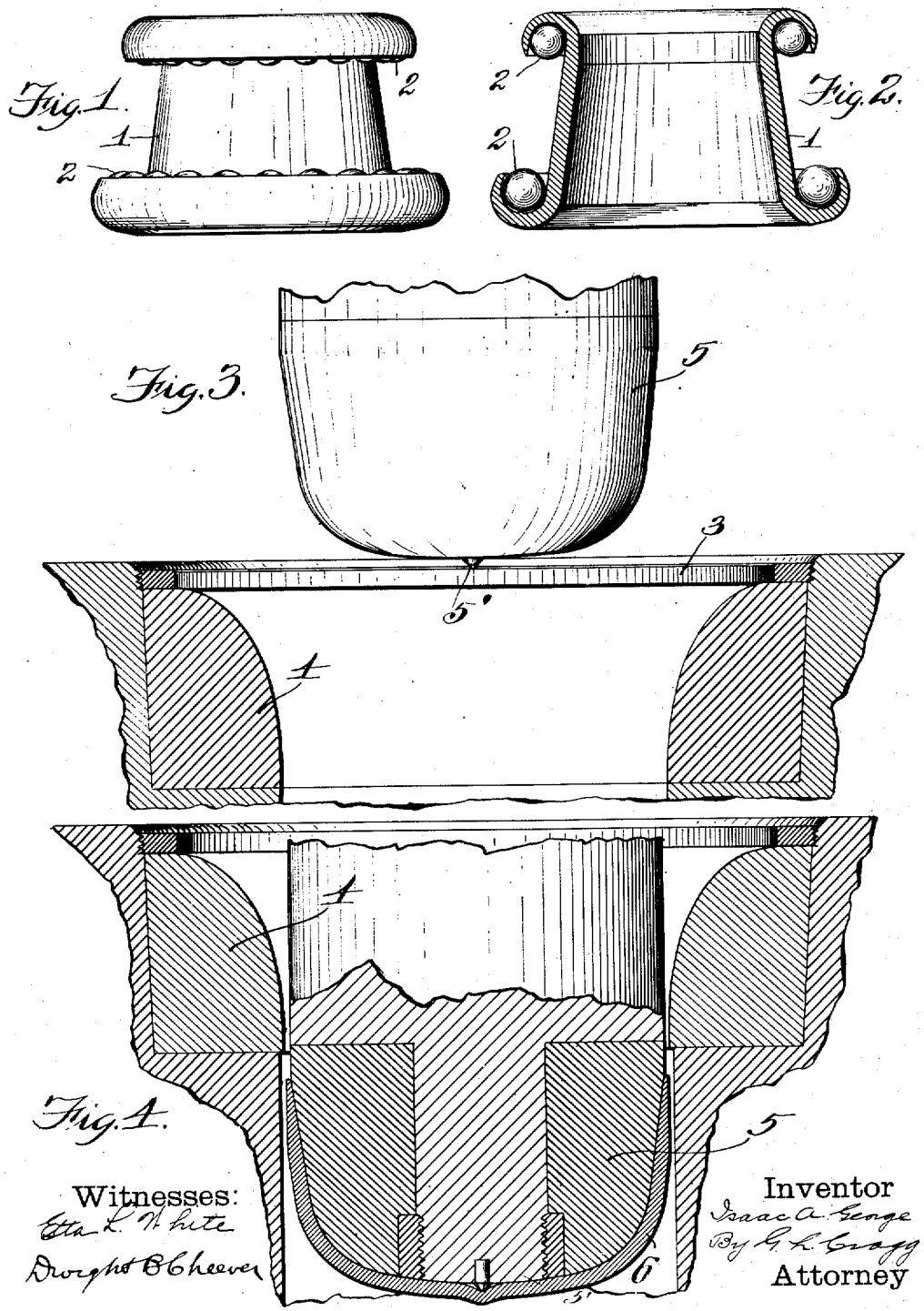
Witnesses:
Inventor
Isaac A. George
By G. L. Cragg
Attorney

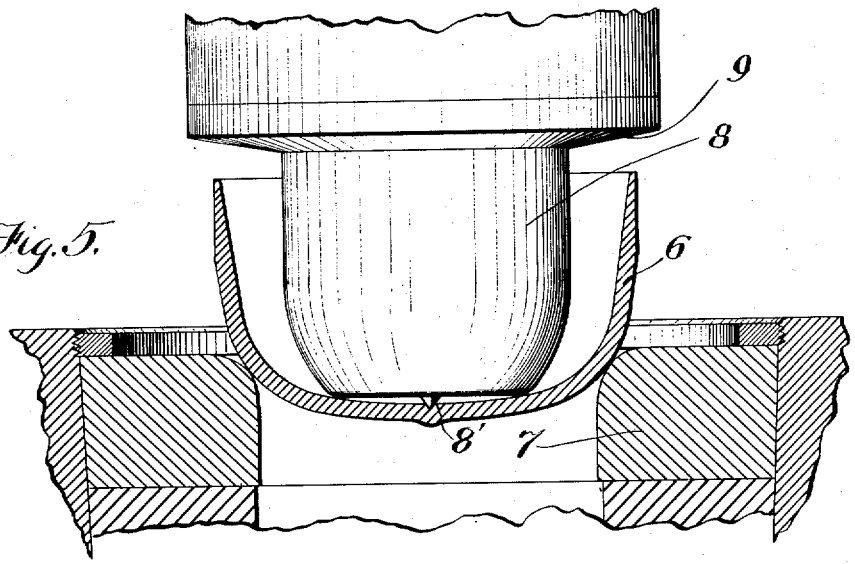
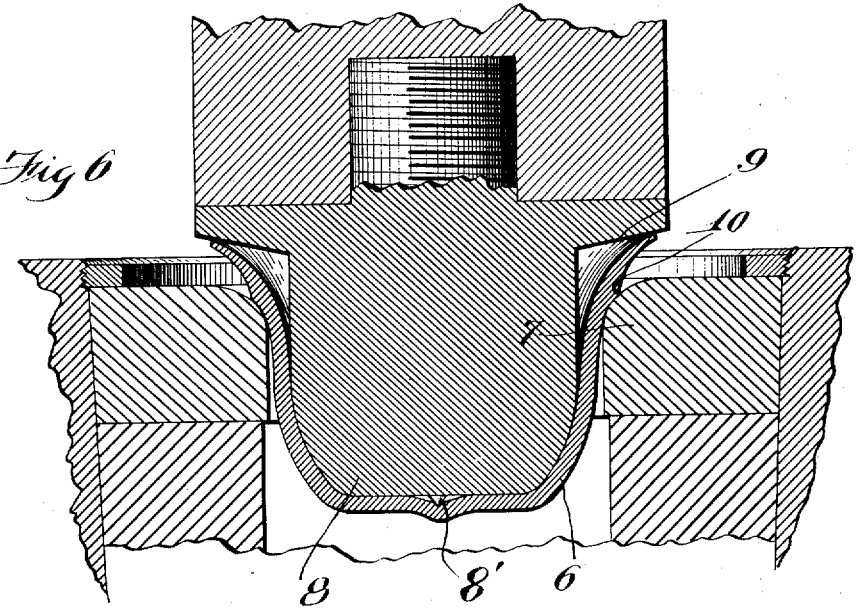

I. A. GEORGE.
METHOD OF MAKING RACEWAY WALLS FOR BEARINGS.
APPLICATION FILED JAN. 8, 1913.
1,173,793.
Patented Feb. 29, 1916.
8 SHEETS—SHEET 3.
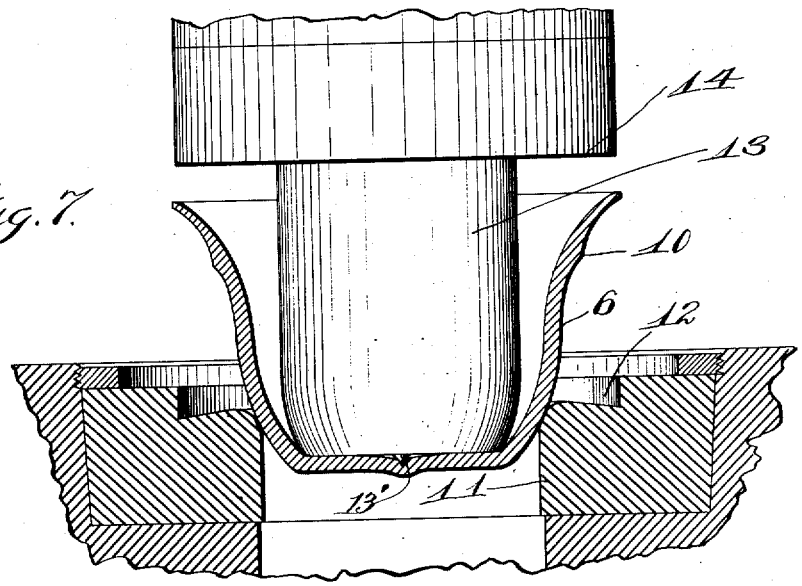
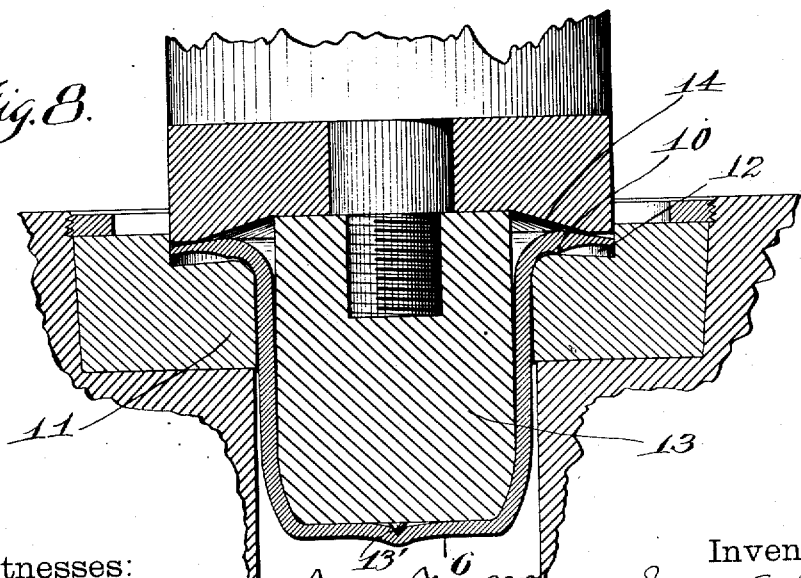

I. A. GEORGE.
METHOD OF MAKING RACEWAY WALLS FOR BEARINGS.
APPLICATION FILED JAN. 8, 1913.

1,173,793.

Patented Feb. 29, 1916.
8 SHEETS—SHEET 4.

Witnesses:

Inventor
Isaac A. George
By G. L. Cragg
Attorney

I. A. GEORGE.
METHOD OF MAKING RACEWAY WALLS FOR BEARINGS.
APPLICATION FILED JAN. 8, 1913.

1,173,793.

Patented Feb. 29, 1916.
8 SHEETS—SHEET 5.

Witnesses:
Etta L. White
Dwight B Cheever

Inventor
Isaac A. George
By G. L. Gragg
Attorney

I. A. GEORGE.
METHOD OF MAKING RACEWAY WALLS FOR BEARINGS.
APPLICATION FILED JAN. 8, 1913.
1,173,793.
Patented Feb. 29, 1916.
8 SHEETS—SHEET 6.
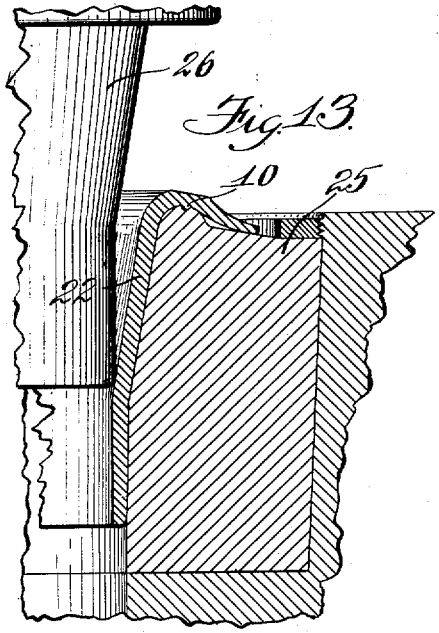
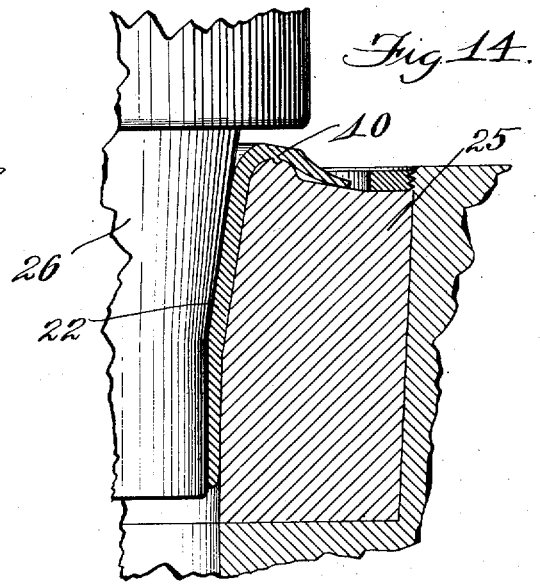
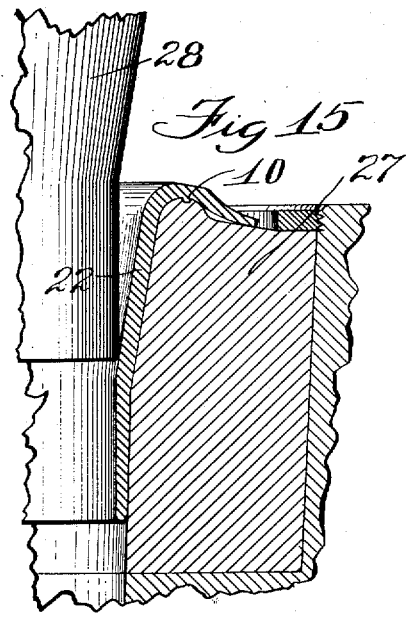
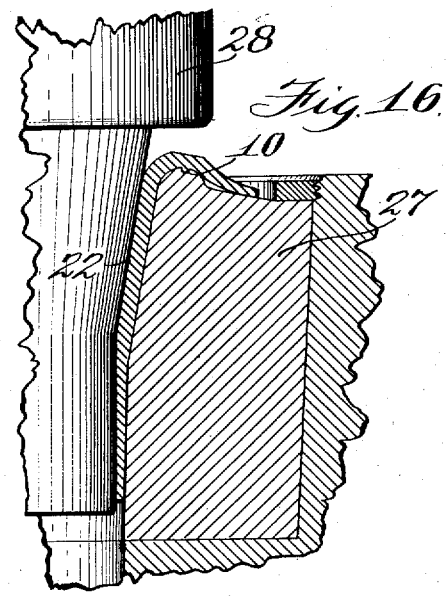
Witnesses:
Inventor
Isaac A. George
By G. L. Cragg
Attorney I. A. GEORGE.
METHOD OF MAKING RACEWAY WALLS FOR BEARINGS.
APPLICATION FILED JAN. 8, 1913.
1,173,793.
Patented Feb. 29, 1916.
8 SHEETS—SHEET 7.
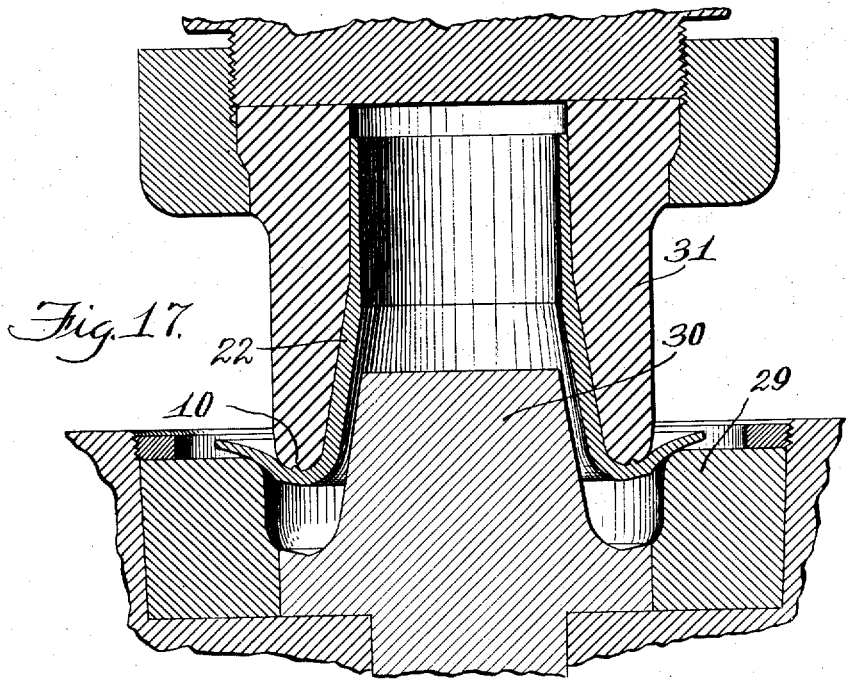
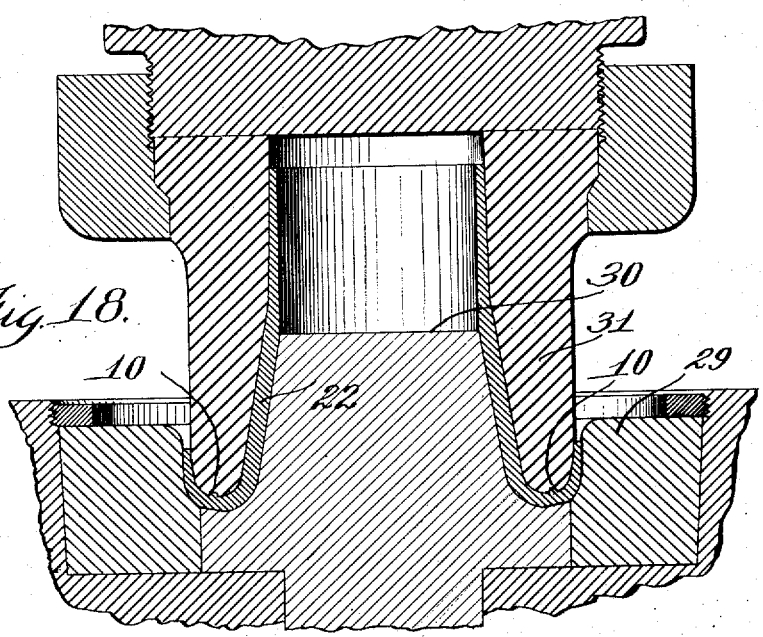
Witnesses:
Etta L. White
Dwight B. Cheever
Inventor
Isaac A. George
By G. L. Cross
Attorney I. A. GEORGE.
METHOD OF MAKING RACEWAY WALLS FOR BEARINGS.
APPLICATION FILED JAN. 8, 1913.

1,173,793.

Patented Feb. 29, 1916.
8 SHEETS—SHEET 8.

Witnesses:
Etta L. White
Dwight B Cheever

Inventor
Isaac A. George
By G. R. Gragg
Attorney

UNITED STATES PATENT OFFICE.

ISAAC A. GEORGE, OF HAMILTON, OHIO.

METHOD OF MAKING RACEWAY-WALLS FOR BEARINGS.

1,173,793.   Specification of Letters Patent.   Patented Feb. 29, 1916.

Application filed January 8, 1913. Serial No. 740,772.

*To all whom it may concern:*

Be it known that I, ISAAC A. GEORGE, citizen of the United States, residing at Hamilton, in the county of Butler and State of Ohio, have invented a certain new and useful Improvement in Methods of Making Raceway-Walls for Bearings, of which the following is a full, clear, concise, and exact description, reference being had to the accompanying drawings, forming a part of this specification.

My invention relates to the formation of roller bearings employing conically shaped or flaring raceway walls such, for example, as is disclosed in my co-pending application Serial No. 543,665, filed February 14, 1910, where such raceway walls are broadly claimed, and has for its object the provision of an improved method of and structure for producing such raceway walls.

My invention comprises a method of making raceway walls which consists in outwardly curling the ends of a metal tube to constitute ball containers and upsetting the metal at the base and within one of the ball containers to constitute a ball supporting ridge.

The apparatus herein disclosed forms the subject matter of my co-pending application Serial No. 790,840, filed September 20, 1913.

The invention will be explained in all of its details by reference to the accompanying drawings illustrating the preferred way of practising the invention and in which drawings—

Figure 1 is a view in elevation of the product to be produced by the method and structure of my invention; Fig. 2 is a sectional view of the structure shown in Fig. 1, the balls being illustrated in position within the raceway walls shown in Figs. 1 and 2; and Figs. 3 to 20, inclusive, are views illustrating the various steps employed to produce the raceway walls.

Like parts are indicated by similar characters of reference throughout the different figures.

The tapering raceway wall 1 comprises the inner raceway member of a bearing such as is disclosed in my aforesaid co-pending application, this inner raceway member having the tapering seat received within the tapering bore of the raceway wall. The raceway wall is curled at its edges to constitute containers for holding the balls 2.

The raceway wall is made from a disk of sheet metal 3 (Fig. 3) which is preferably so operated upon by the preferred form of structure of my invention as to have the degrees of inclination upon the exterior and interior of the raceway wall similar whereby the thickness of the raceway wall is substantially uniform throughout, with the exception of the overturned edge portions, whereby the uniformly thick portion of the raceway wall is able to be treated by heat uniformly in hardening. In being hardened the larger end of the raceway wall is immersed first.

The first step in the operation is illustrated in Figs. 3 and 4, the disk plate 3 being initially placed upon the edges of a female die 4 having a cylindrical bore and co-axial with respect to a punch 5, the die 4 being of an inwardly convexed or bulging flaring formation properly to coöperate with the punch to impart an initial cup shape to the plate 3 as illustrated in Fig. 4, in which figure the plate 3 has been brought to a shape in which the thickness thereof is substantially uniform excepting at the upper periphery of the cup. The cup 6 is cylindrical at the outer portion of its upper margin and is tapering within its interior and also upon its exterior below the cylindrical part. The lower end of the punch 5 is tapered correspondingly to the interior of the cup and coöperates with the inwardly curved portions of the die to produce the shape of the cup shown in Fig. 4. The cup 6 is then removed from the punch 5 and is placed upon the upper edge of a female die 7 having a bore which is generally cylindrical but flared at its upper end where the die 7 is inwardly convexed. A punch is caused to operate upon the cup, this punch having a cup entering portion 8, that is considerably smaller than the cup interior, and an overhanging portion 9 which is to engage the top of the cup.

Clearance between the punch portion 8 and the wall of the die 7 is somewhat in excess of the thickness of the cup wall so that when the punch is caused to descend the cup 6 will be caused to assume the shape shown in Fig. 6. In each punch and die operation it is understood that the axes of the punch and die are coincident. It will be observed that the cup 6, in Fig. 6, has been slightly upset at 10 for the purpose of forming a ball bearing ridge in the final product as will appear, the curved upper portion of the die 7 and the punch serving to force sufficient metal upwardly to secure the formation illustrated. The cup 6 is next removed from the punch 8, 9 and is placed upon the upper curved edge of the female die 11 having a bore which is generally cylindrical but flared at its upper end where the die 11 is inwardly convexed, the curve being materially less than the curve at the upper portion of the die 7 and closely approximating the curvature of the ball containing pocket to be formed at one end of the raceway wall under construction. The die 11 is also indicated as having a recess 12 into which the upper end of the cup may be pressed. A punch is caused to operate upon the cup, the punch having a cup entering portion 13, that is considerably smaller than the cup interior, and an overhanging portion 14 that is to engage the top of the cup. The outer peripheral edge of the portion 14 and a circular edge of corresponding diameter of die 11 constitute trimming edges evenly to trim the overhanging portion of the flange on the tube 6. Centering points $5^1$, $8^1$, and $13^1$ operate to keep the work on center.

Clearance between the punch portion 13 and the wall of the die 11 is somewhat in excess of the thickness of the cup wall so that when the punch is caused to descend the cup 6 will be caused to assume the shape shown in Fig. 8, the upper curved end of the die shaping the outer part of the cup approximately into the curve of the ball containing pocket now partially formed, the portion of the cup between its rim and the ridge 10 projecting horizontally owing to the overhanging portion 10 of the punch and the receiving recess 12 of the die 11. The cup 6 is next removed and is placed partially within the tapering bore of a female die 15 as illustrated in Fig. 9, the upper edge of this die 15 being curved to approximate a part of the curvature of the ball containing pocket to be formed, there being an annular recess 16 at the upper end of the die in which the ridge 10 is accommodated. The die 15 has an annular recess 17 to afford clearance for the outer rim of the cup when the punch that is to be described descends. This punch has a tapering portion 18, a cylindrical portion 19, and an overhanging portion 20, the cup 6 having its structure altered by the portions 18 and 20 of the punch while at the same time the bottom of the cup is removed by the cylindrical portion 19 of the punch in coöperation with a shearing ring 21 located below the die, ring 21 rising to dislodge the work, the knock out pieces being hollow to permit the cup bottom to drop through. That which was the cup as illustrated in Fig. 9 now has become the sleeve element 22 in Fig. 10, the punch portions 18 and 19 being complemental to similarly directed bore portions of the die 15, the clearance between the die and punch when the punch has fully entered the die corresponding to the thickness of the sleeve element 22. The overhanging punch portion 20 engages the overhanging top portion of the cup, as seen in Fig. 9, to cause the metal ridge 10 to be further upset within the recess $16^1$ of the die 15.

Figure 10:
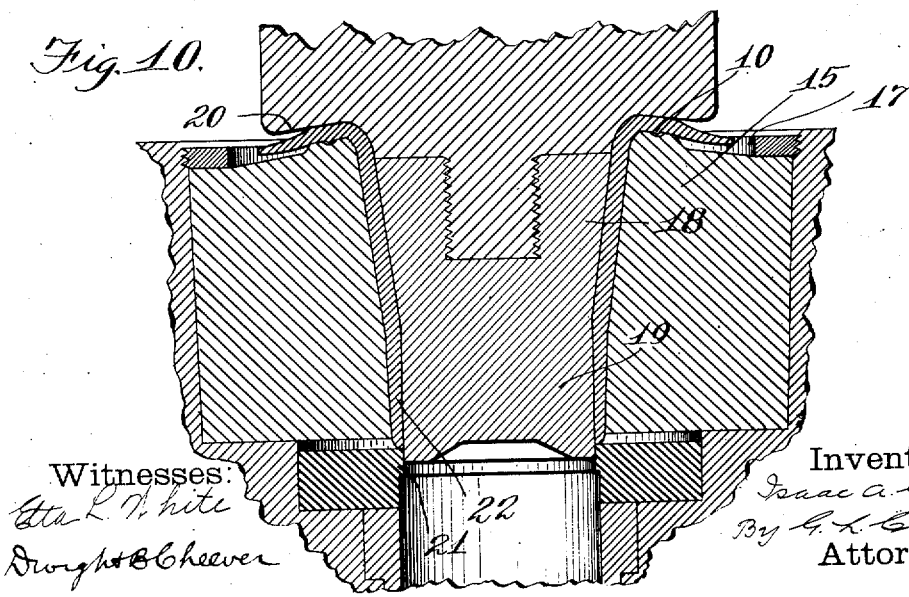
Figure 11:
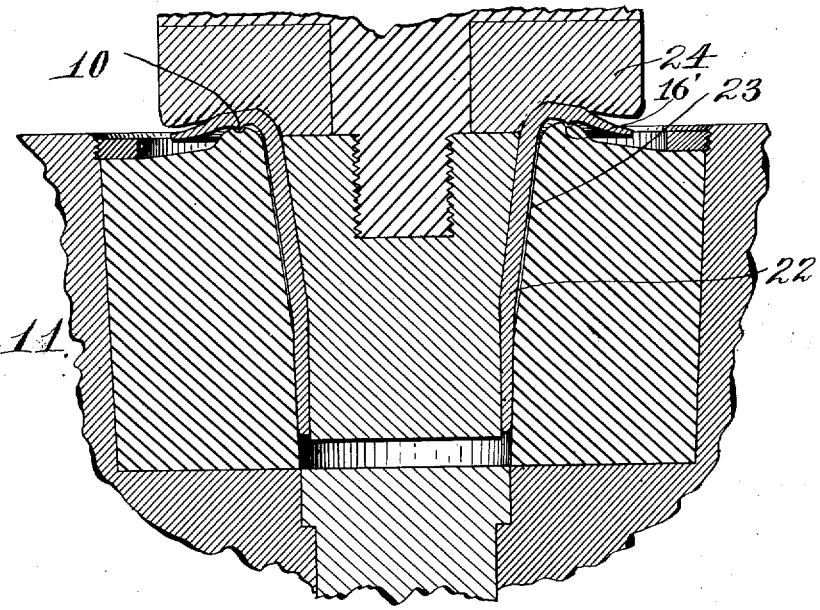
Figure 12:
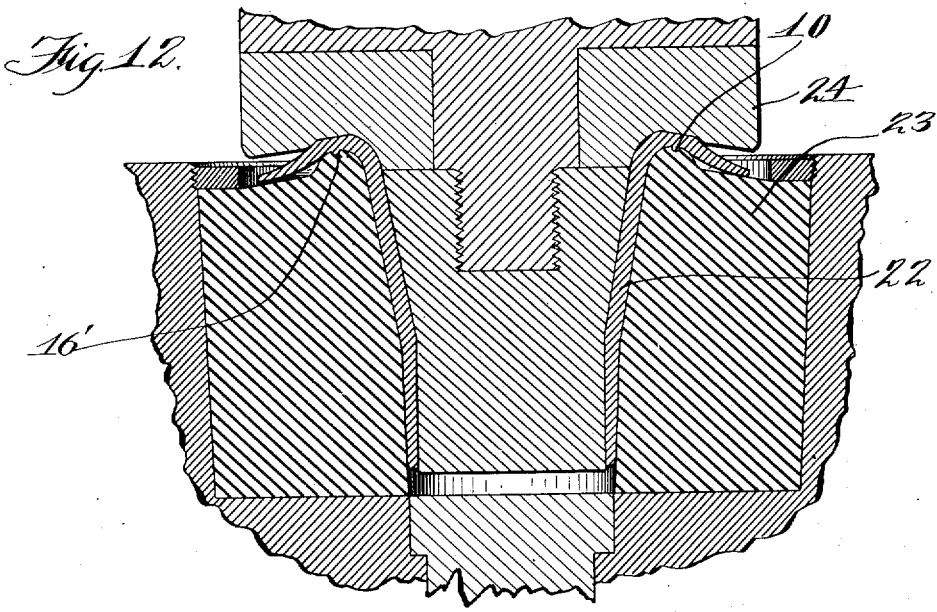
Figure 19:
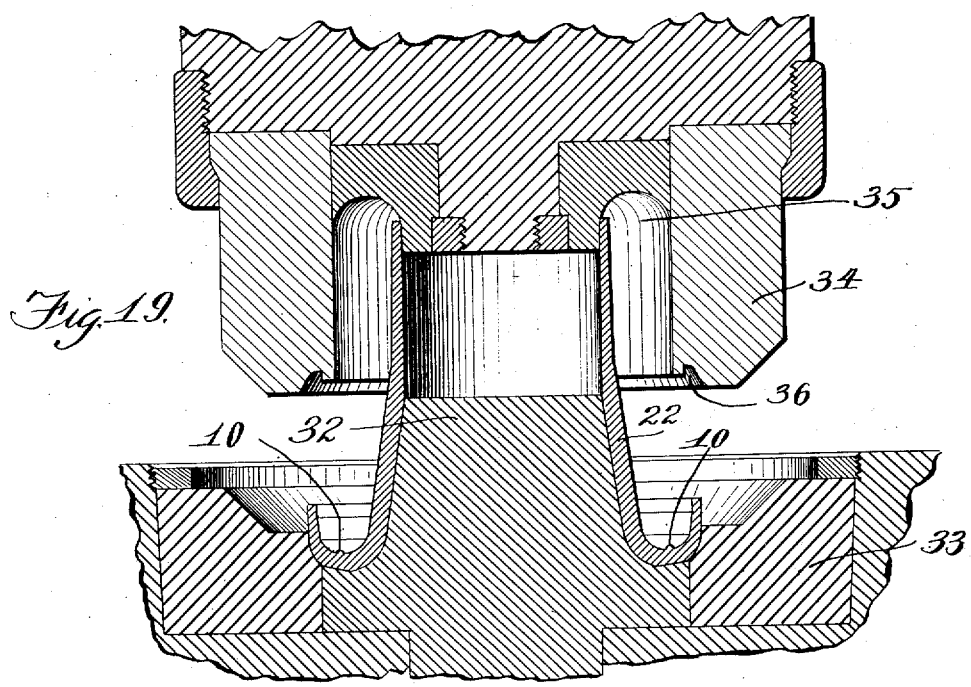
Figure 20:
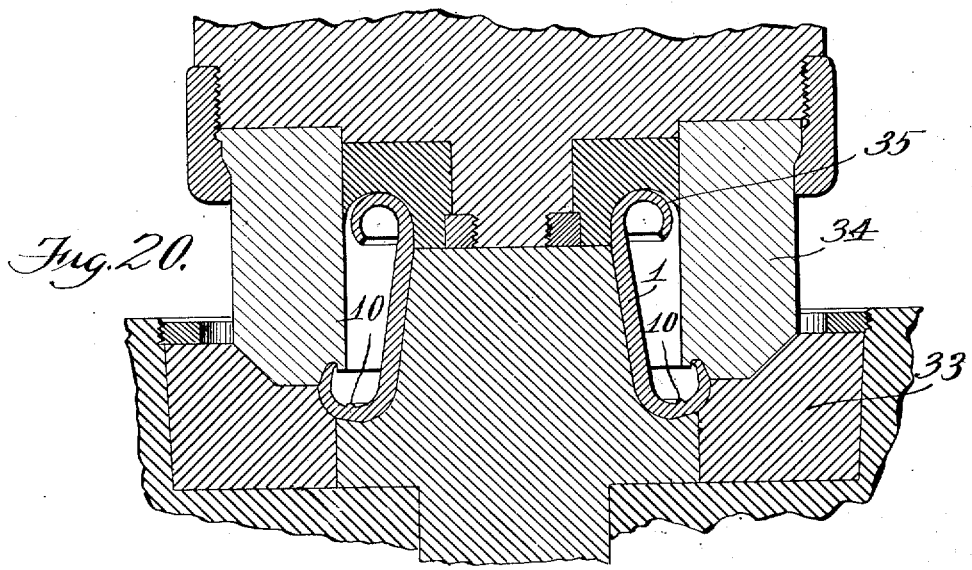

The sleeve 22 as produced by the operations described in connection with Figs. 9 and 10 is next almost completely inserted within the bore of a female die 23, Fig. 11. The punch 24 is thereafter depressed to bring the sleeve or tube 22 into the shape illustrated in Fig. 12. The sleeve or tube 22 is then withdrawn from the bore of the die 23 and is thereafter inserted within the bore of the female die 25, Fig. 13. The punch 26 is thereupon lowered to elongate the lower cylindrical portion of the tube 22 and to bring the same into the shape illustrated in Fig. 14, the punch 26 having an upper tapering portion and a lower cylindrical portion for this purpose. The sleeve or tube 22 is thereafter placed within the bore of the female die 27, Fig. 15, whereafter the punch 28 is depressed, see Fig. 16, further to modify the shape of the sleeve or tube 22. The sleeve 22 is next inverted with the flange thereof seated upon the curved periphery of a die 29 that has a central upwardly extending conical projection 30 corresponding to the tapered portion of the tube 22. A hollow punch 31 has the lower portion of its bore tapered to correspond with the tapering part of the sleeve or tube 22 and an upper portion of the bore cylindrical to correspond with the cylindrical portion of the tube 22. This punch 31 has a curvature at its lower end corresponding to the curvature that is to be provided within the ball retaining pocket provided at the larger end of the raceway wall as shown in Figs. 1 and 2, the lower end of the punch having an annular groove or depression for preserving the shape of the ridge 10. An annular space intervenes between the conical portion 30 of the die 29 and the outer portion of the die, clearance intervening between the inner and outer portions of the die and the annular portion of the punch, when the punch is fully depressed, as indicated in Fig. 18, that partially corresponds to the shape of the larger end of the raceway wall. The tube 22 is next placed upon the tapering portion 32, Fig. 19, of a die 33, the tapering portion 32 fitting the tapered portion of the tube, the die having a suitable annular recess for receiving the outwardly curved portion of the flanged part of the tube, this recess being enlarged to permit the outer rim of the curled portion to project into clear space to permit of the operation of the punch 34 thereupon. The punch 34 has an annular recess 35 for receiving the upper cylindrical portion of the tube 22, this annular recess being curved, as illustrated, so that when the punch is depressed in the position illustrated in Fig. 20 the cylindrical end of the tube is curled to form the ball containing pocket illustrated at the smaller end of the raceway wall 1 of Figs. 1 and 2. The punch 34 has an annular groove 36 for receiving the outer edge of the curled flange at the larger end of the tube 22, this recess 36 being so shaped as to form the curled flange at the larger end of the tube 22 into the shape illustrated in Fig. 20, the complete raceway wall 1 being shown in this figure.

I have shown and described the method of and apparatus for transforming a disk of sheet metal into a raceway wall having a tapering bore and exterior and outwardly curled at its ends to form ball containers, though I do not limit myself to the initial employment of the sheet metal disk since obviously effective operations may be commenced with sheet metal in other forms. For example, the process may be initiated with a suitably shaped metal cup which is operated upon to produce the desired result, any suitable steps being employed in the formation of the cup in order to adapt it to the purpose of the invention.

Reference may be had to my co-pending applications Serial Nos. 726,290 and 726,291, filed Oct. 17, 1912 (Cases A and B).

While I have herein shown and particularly described one way of practising the method of my invention and one form of mechanism for producing the product, I do not wish to be limited to the precise details set forth, but

Having thus described my invention I claim as new and desire to secure by Letters Patent the following:—

The method of making raceway walls for bearings which consists in outwardly curling the ends of a metal tube to constitute ball containers; and upsetting the metal at the base and within one of the ball containers to constitute a ball supporting ridge.

In witness whereof, I hereunto subscribe my name this 18th day of December, A. D. 1912.

ISAAC A. GEORGE.

Witnesses:
G. L. CRAGG,
E. L. WHITE.